United States Patent [19]

Heninger

[11] Patent Number: 4,648,034
[45] Date of Patent: Mar. 3, 1987

[54] BUSY SIGNAL INTERFACE BETWEEN MASTER AND SLAVE PROCESSORS IN A COMPUTER SYSTEM

[75] Inventor: Andrew G. Heninger, Santa Clara, Calif.

[73] Assignee: Zilog, Inc., Campbell, Calif.

[21] Appl. No.: 644,868

[22] Filed: Aug. 27, 1984

[51] Int. Cl.[4] ............................................. G06F 15/16
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,940,743 | 2/1976 | Fitzgerald | 364/200 |
| 3,962,685 | 6/1976 | Belle Isle | 364/200 |
| 4,224,664 | 9/1980 | Trinchieri | 364/200 |
| 4,270,167 | 5/1981 | Koehler et al. | 364/200 |
| 4,547,849 | 10/1985 | Louie et al. | 364/200 |

Primary Examiner—Raulfe B. Zache
Assistant Examiner—William G. Niessen
Attorney, Agent, or Firm—Majestic, Gallagher, Parsons & Siebert

[57] ABSTRACT

A 32-bit central processing unit (CPU) having a six-stage pipeline architecture with an instruction and data cache memory and a memory management units, all provided on a single, integrated circuit (I.C.) chip. The CPU also contains means for controlling the operation of a separate I.C. chip co-processor that is dedicated to performing specific functions at a very high rate of speed, commonly called an extended processing unit (EPU). The EPU is provided with interface circuits that generate control signals and communicate them to the controlling CPU.

6 Claims, 17 Drawing Figures

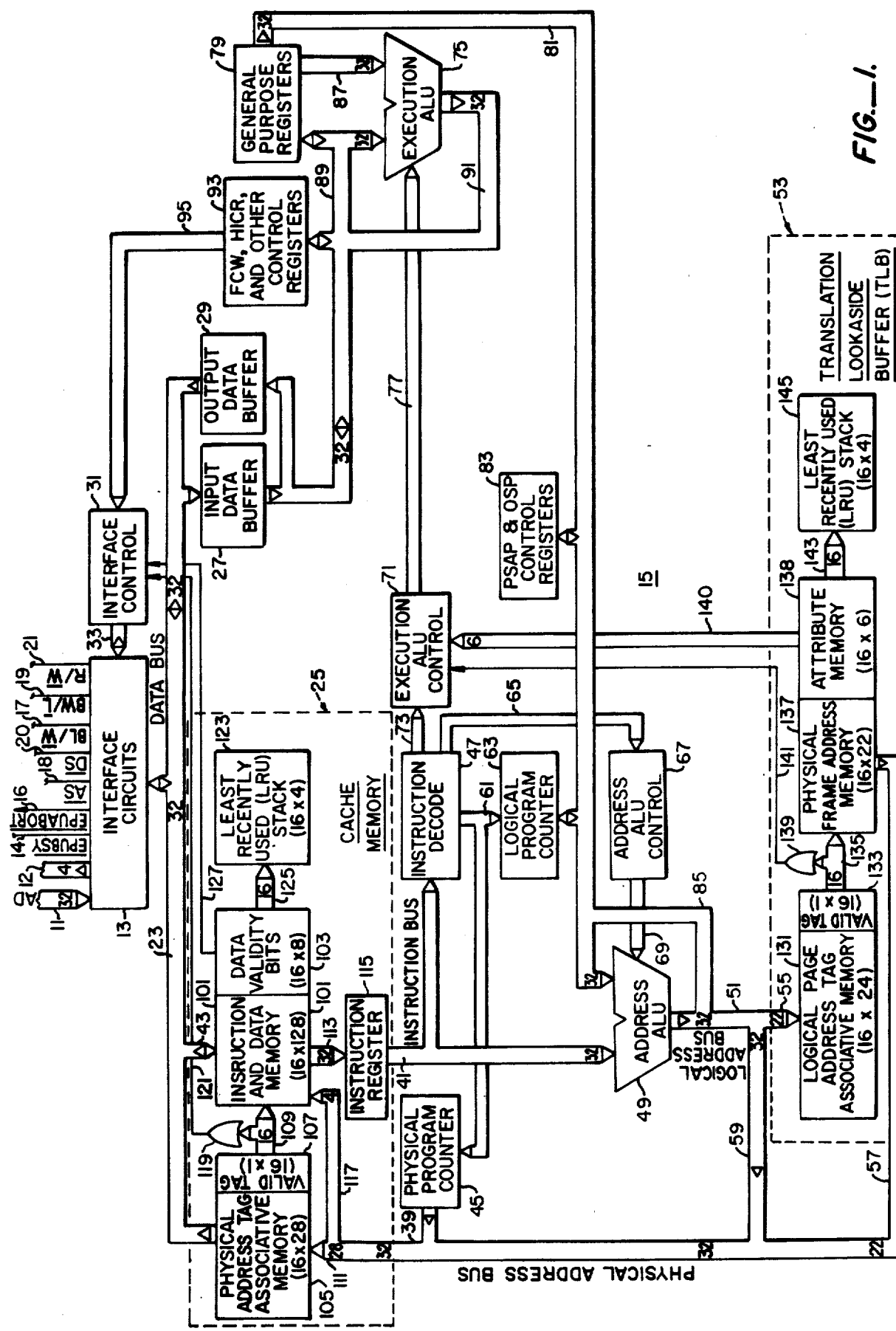

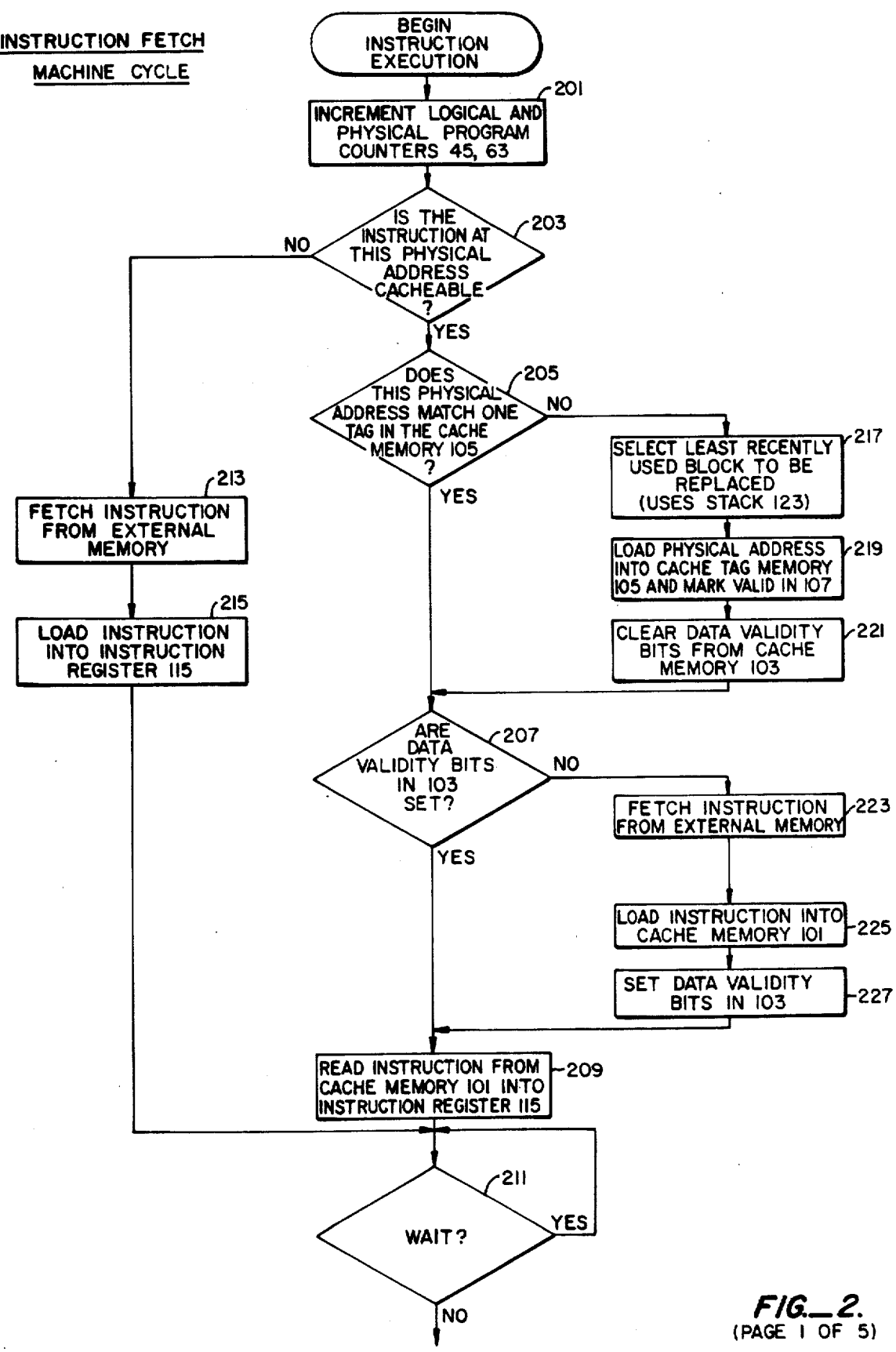
FIG_2.
(PAGE 1 OF 5)

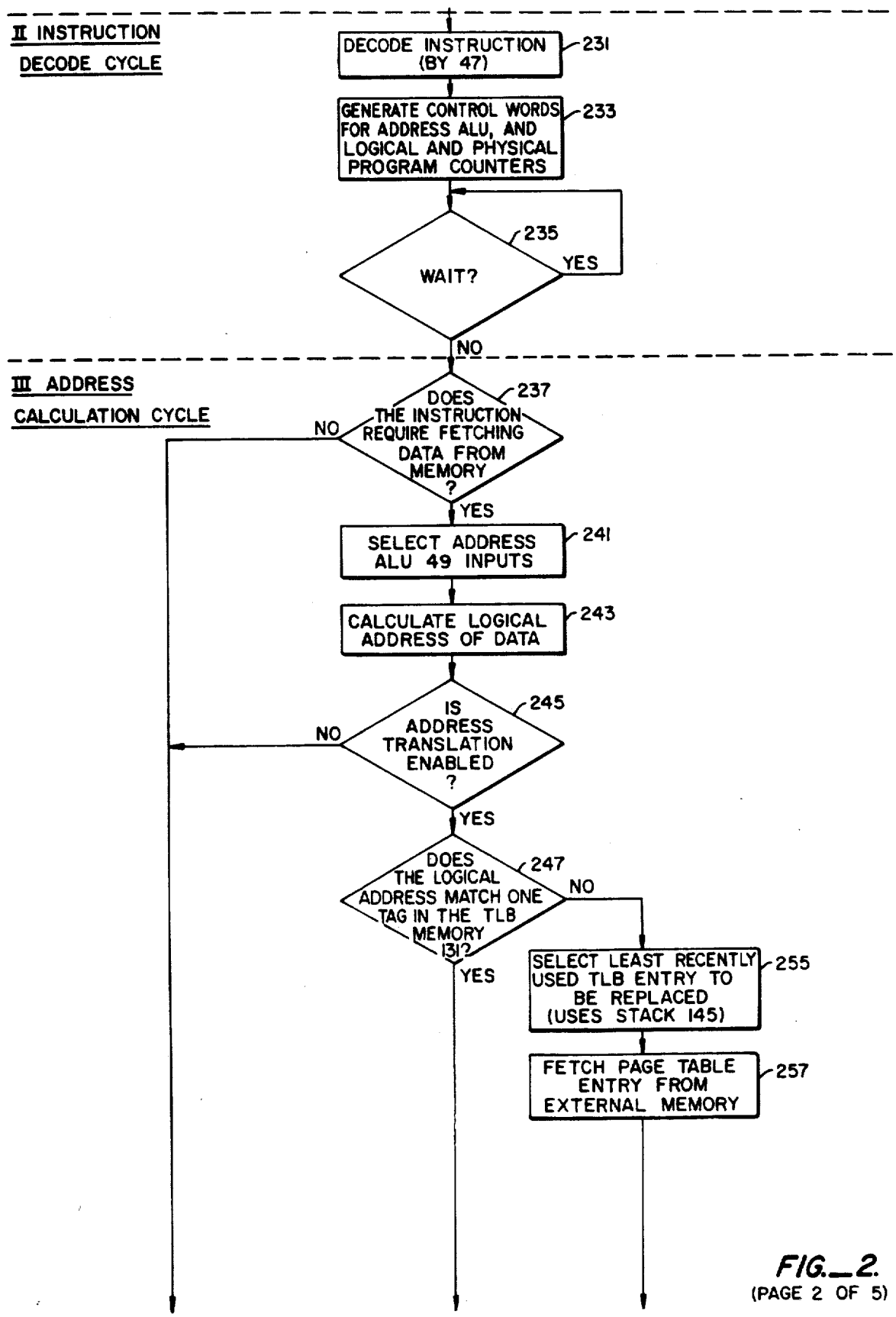
FIG._2.
(PAGE 2 OF 5)

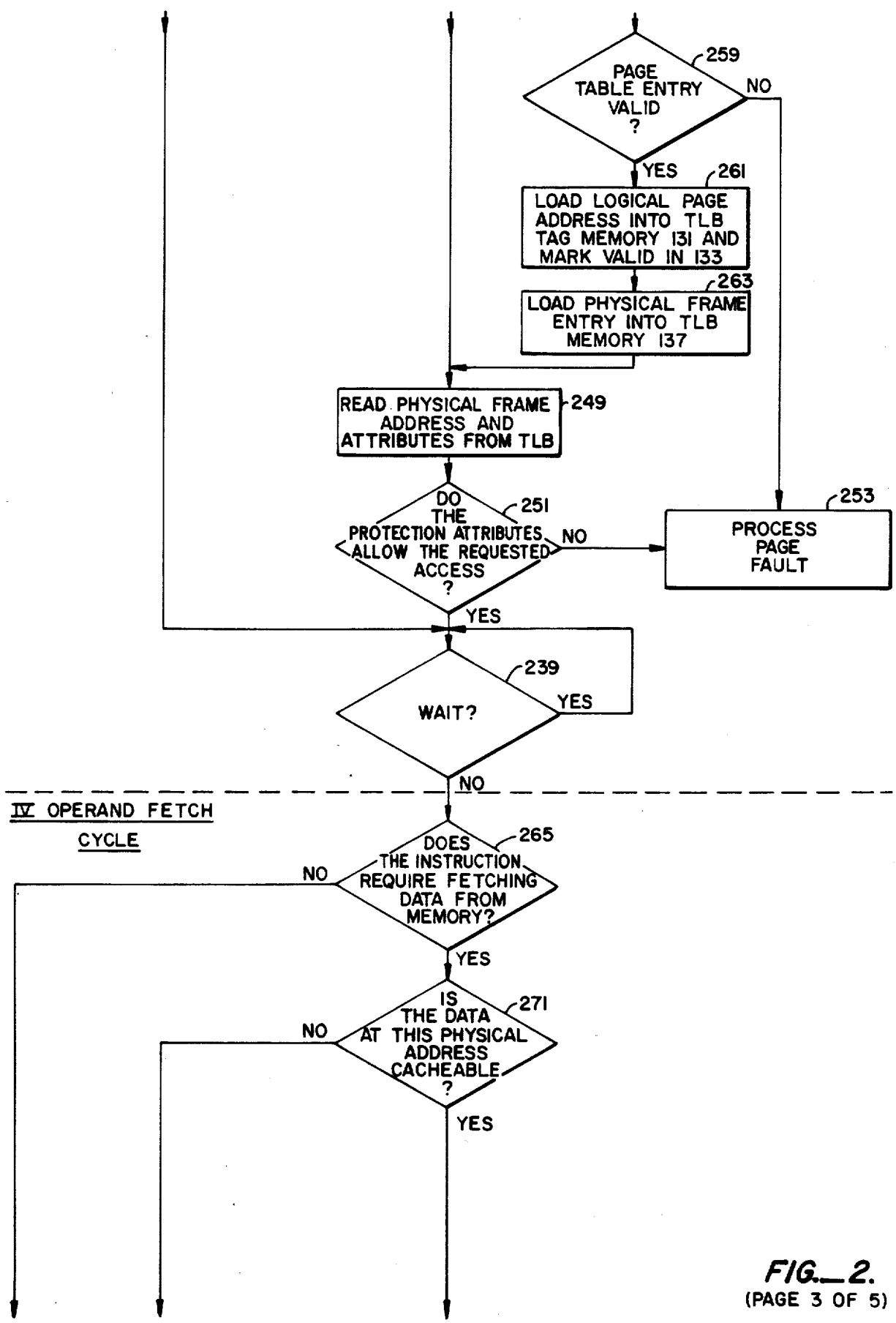
FIG.\_2.
(PAGE 3 OF 5)

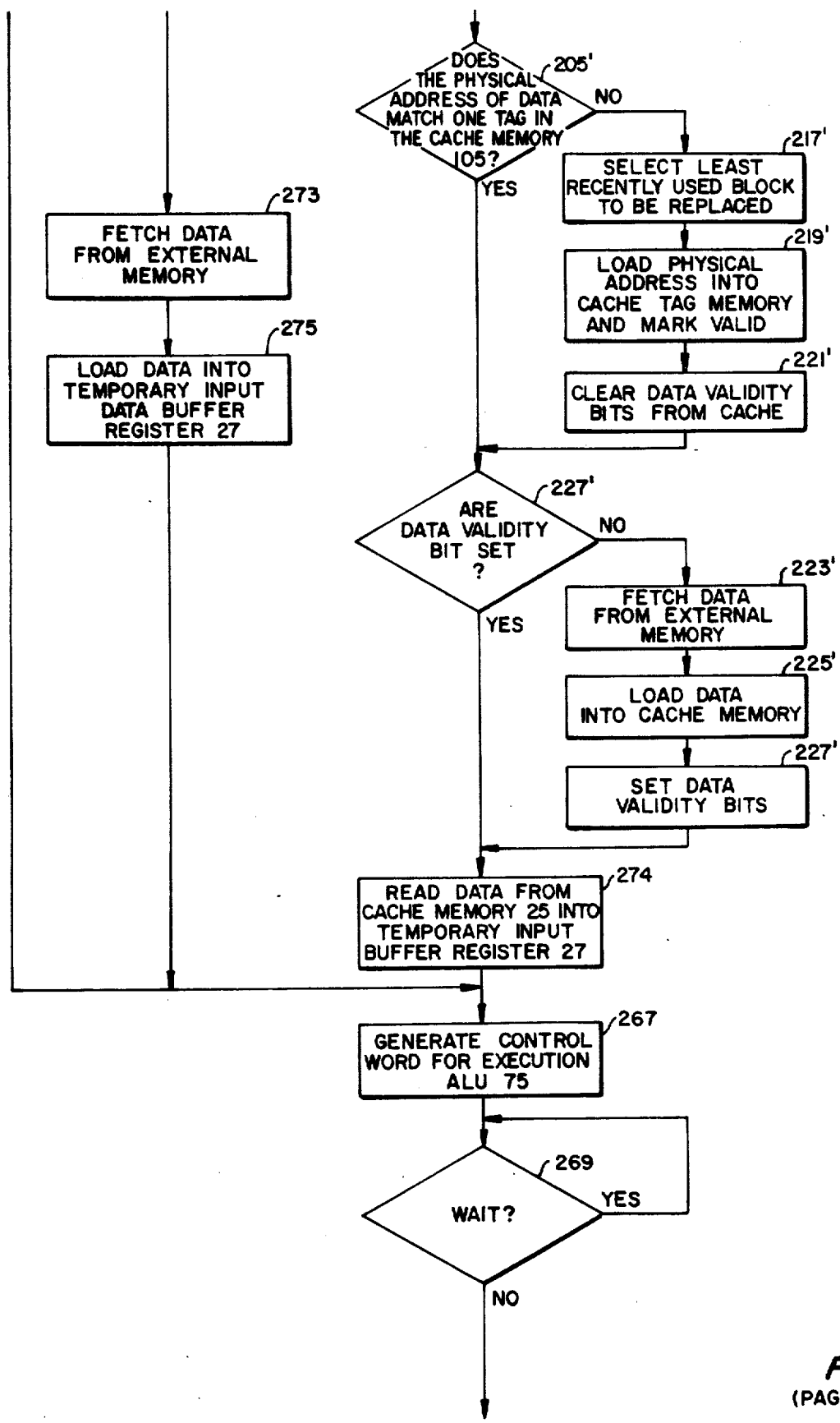
FIG._2.
(PAGE 4 OF 5)

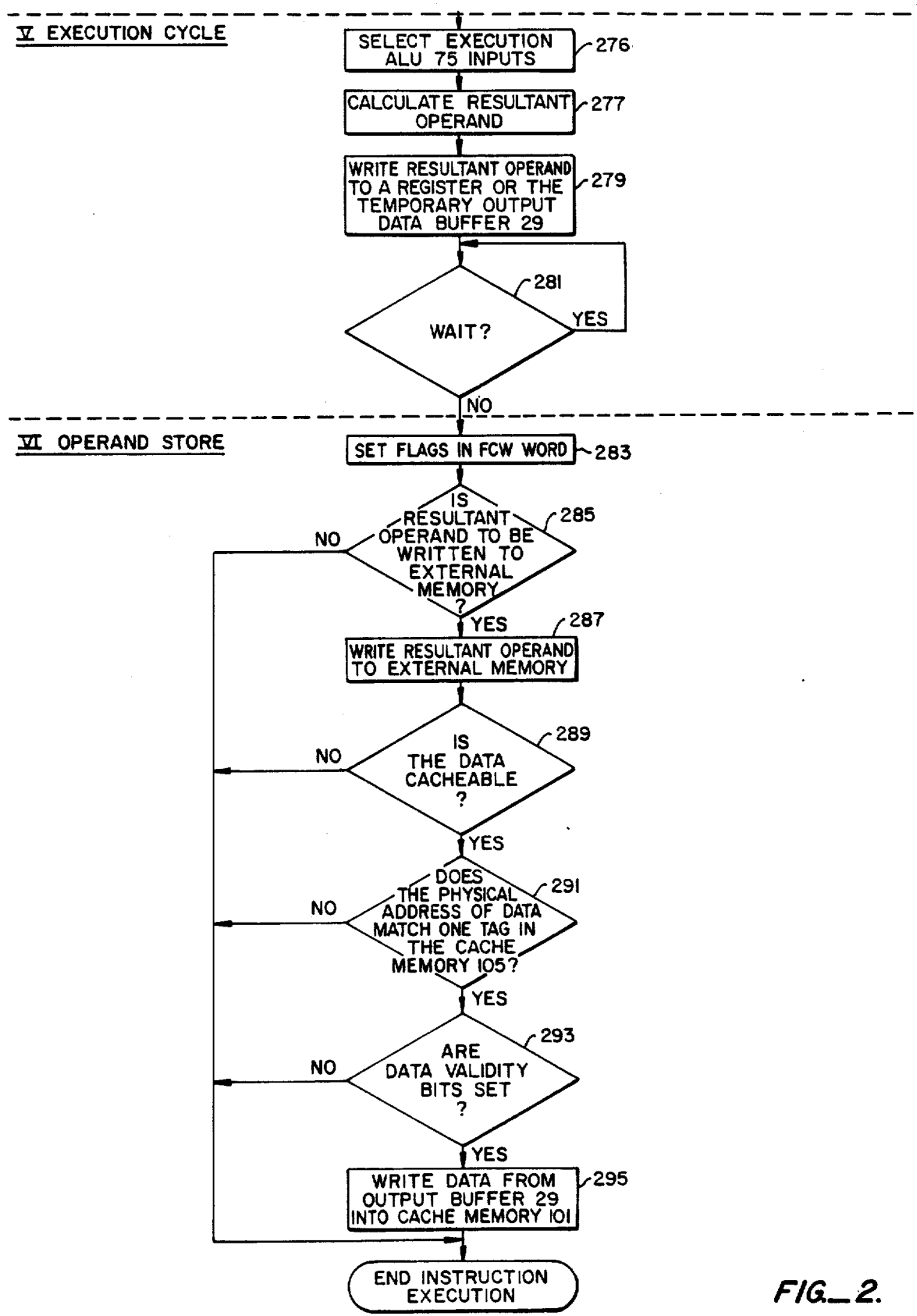
FIG._2.
(PAGE 5 OF 5)

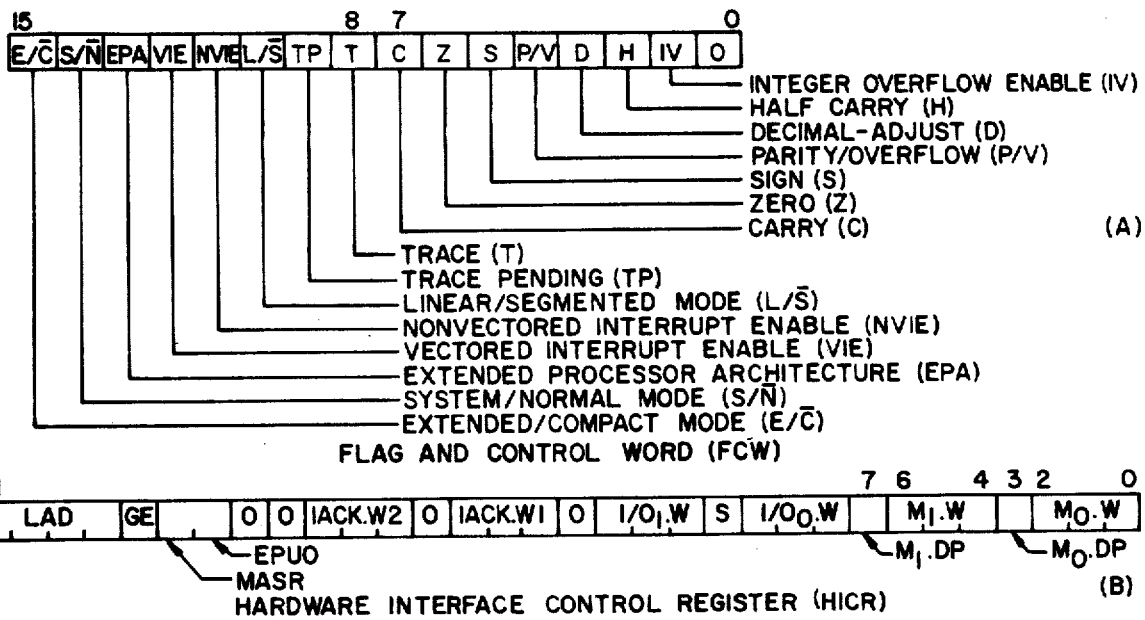
FIG._3.
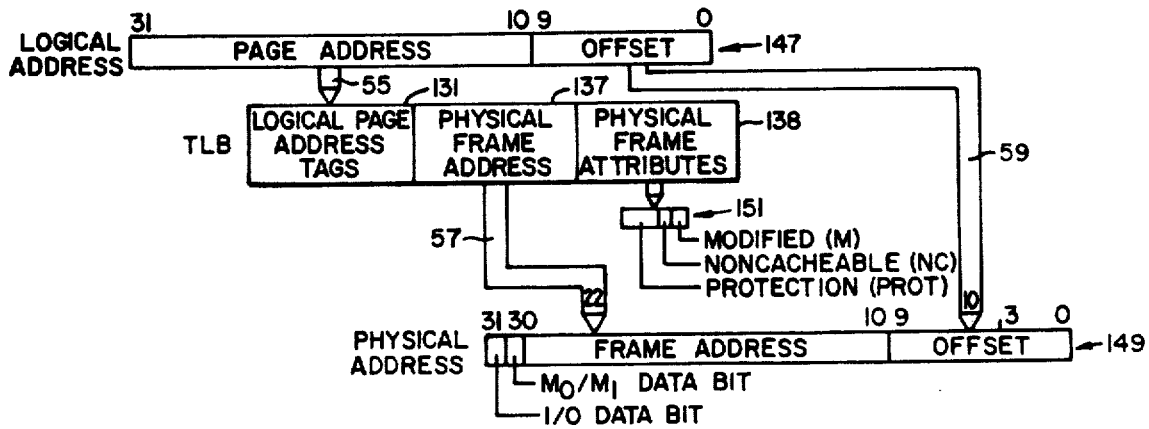
FIG._4.
PROTECTION (PROT) FIELD ENCODING
| ENCODING | SYSTEM | NORMAL (USER) |
|---|---|---|
| 0 0 0 0 | NA | NA |
| 0 0 0 1 | RE | NA |
| 0 0 1 0 | RE | E |
| 0 0 1 1 | RE | RE |
| 0 1 0 0 | E | NA |
| 0 1 0 1 | E | E |
| 0 1 1 0 | R | NA |
| 0 1 1 1 | R | R |
| 1 0 0 1 | RW | NA |
| 1 0 1 0 | RW | R |
| 1 0 1 1 | RW | RW |
| 1 1 0 0 | RWE | NA |
| 1 1 0 1 | RWE | E |
| 1 1 1 0 | RWE | RE |
| 1 1 1 1 | RWE | RWE |
NA-no access is permitted
R-read access is permitted
W-write access is permitted
E-execute access is permitted
FIG._5.

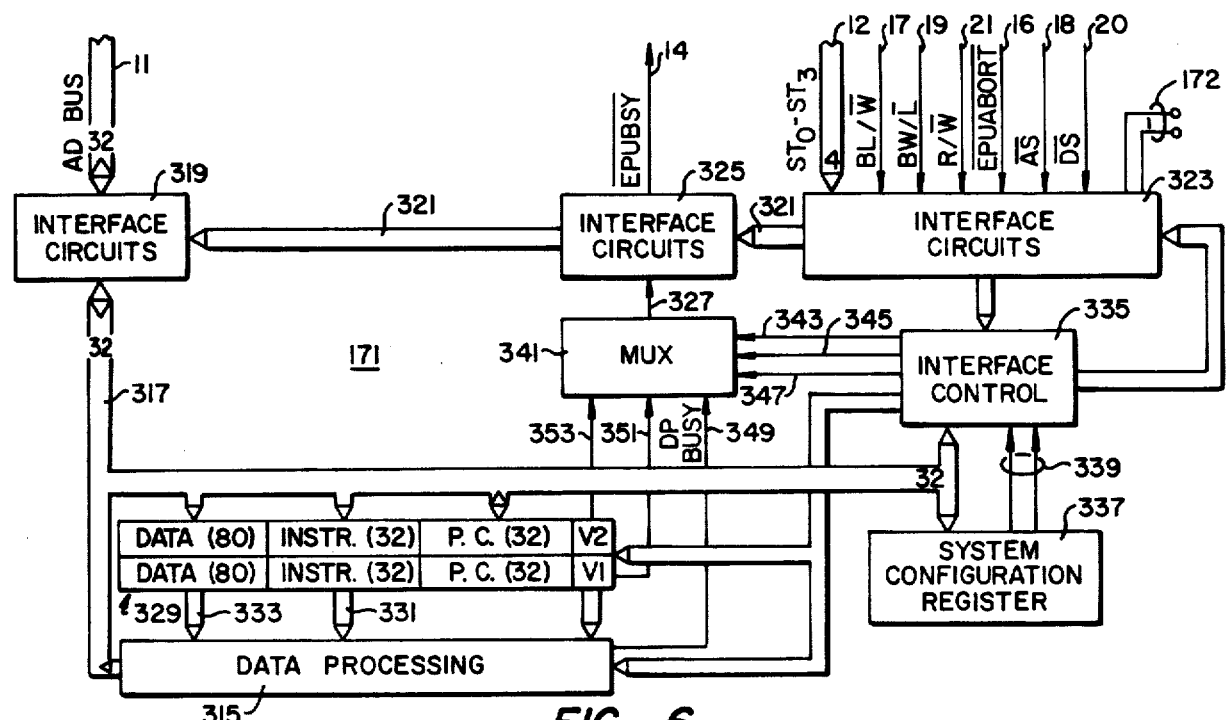
FIG._6.
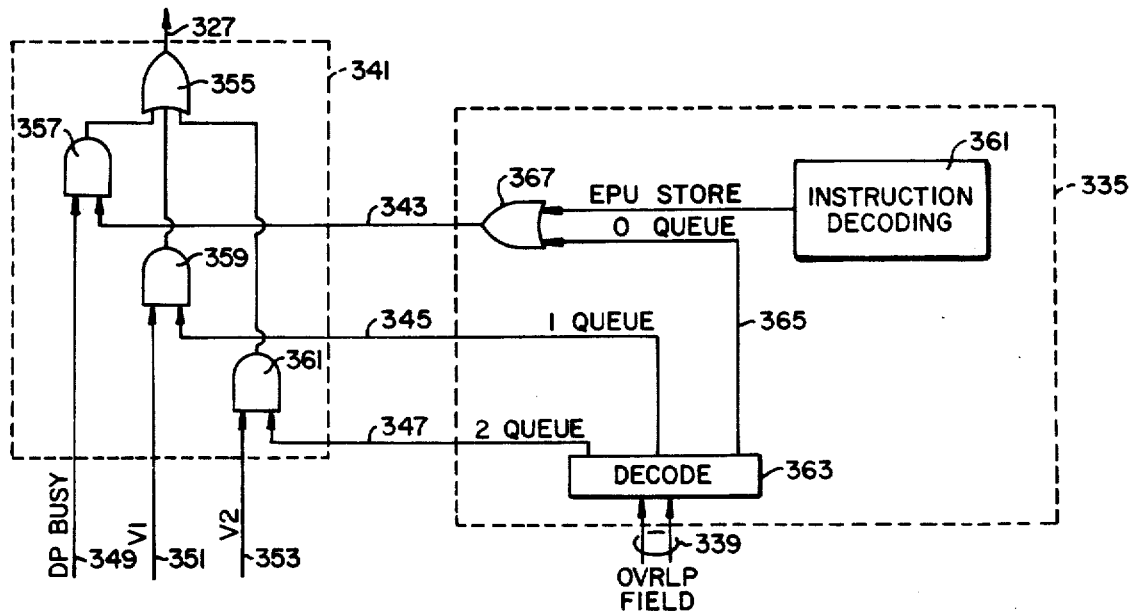
FIG._7.
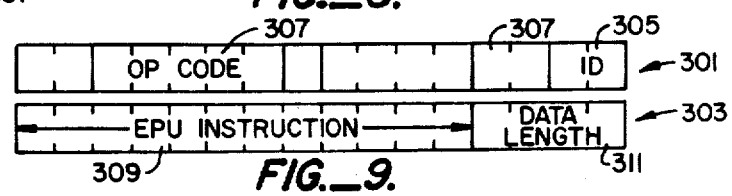
FIG._8.
FIG._9.

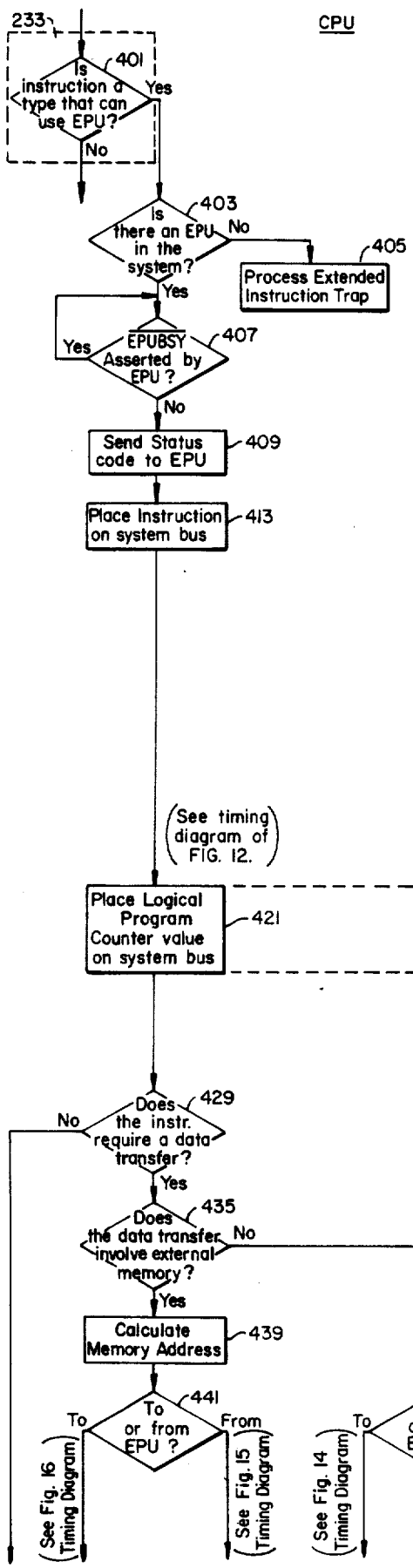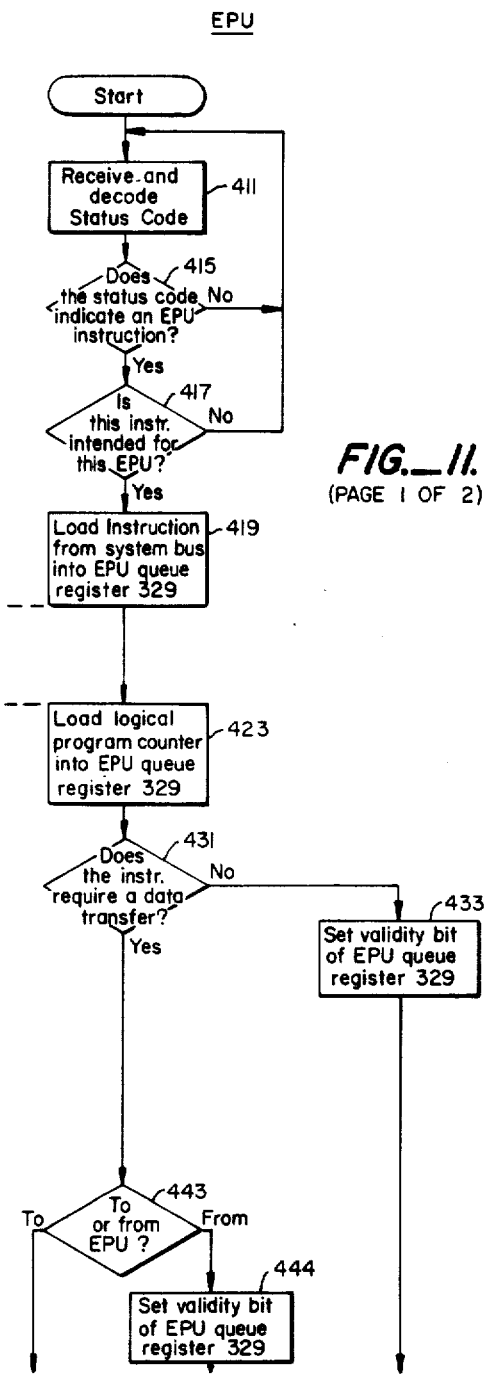
FIG._10. (PAGE 1 OF 2)
FIG._11. (PAGE 1 OF 2)

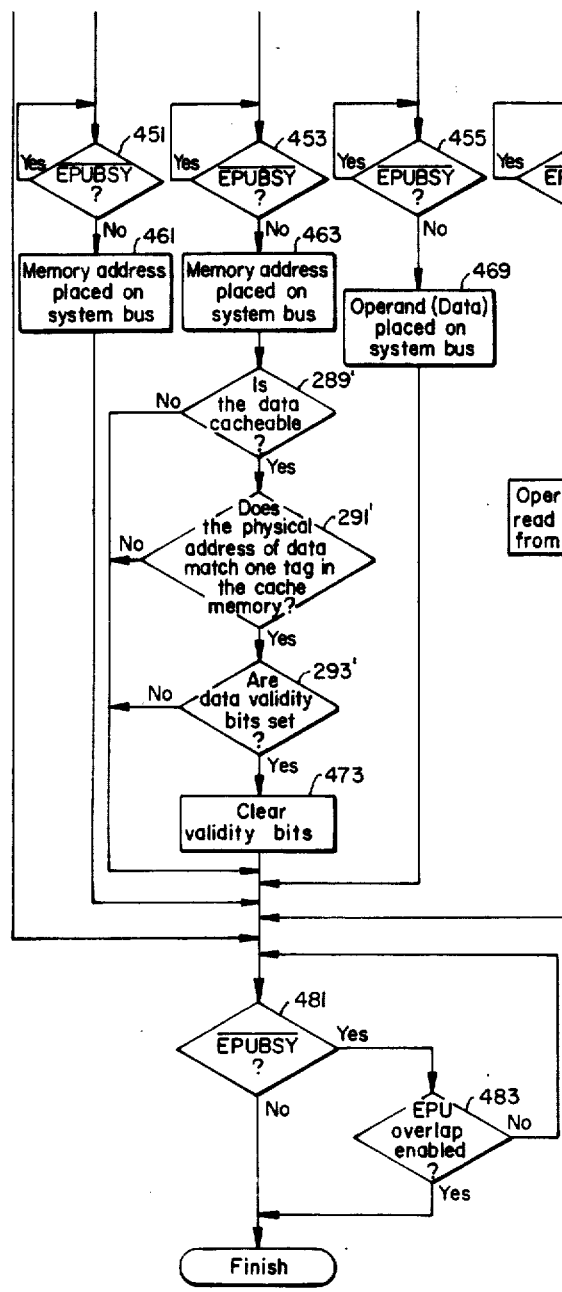
FIG._10.
(PAGE 2 OF 2)
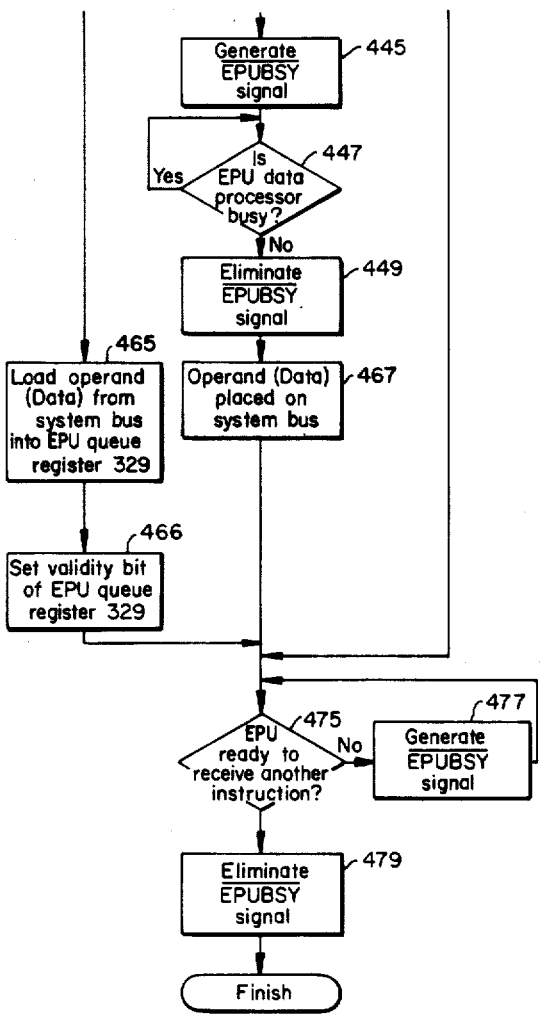
FIG._11.
(PAGE 2 OF 2)

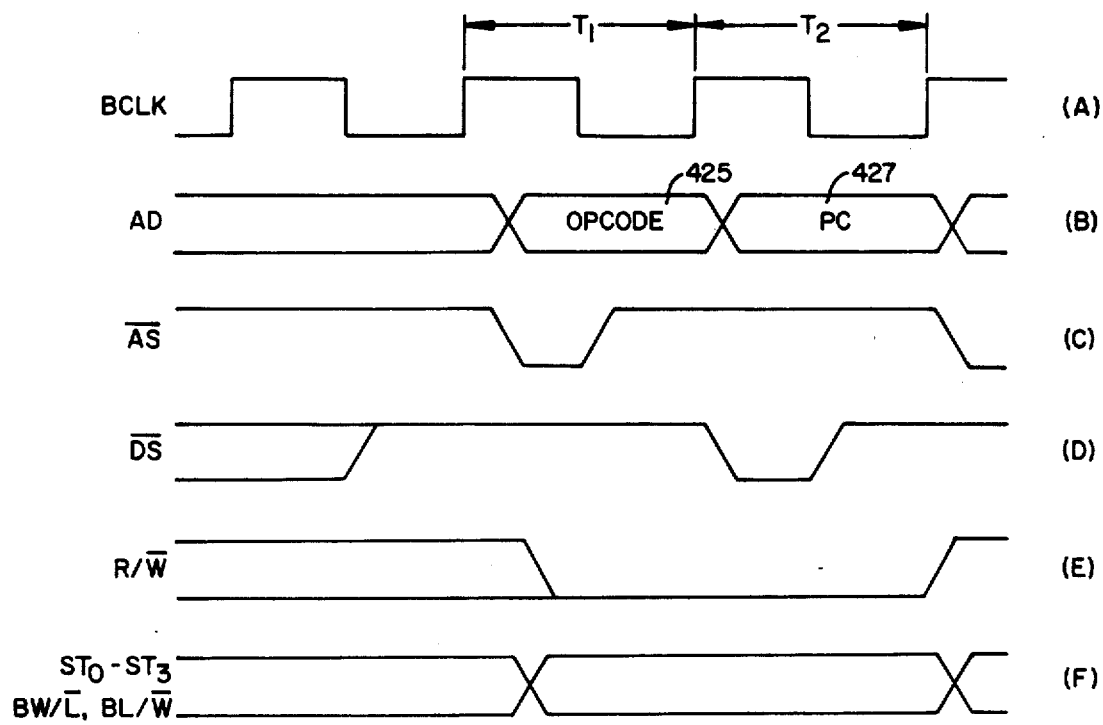
FIG._12.
(CPU-EPU INSTRUCTION TRANSFER TIMING)
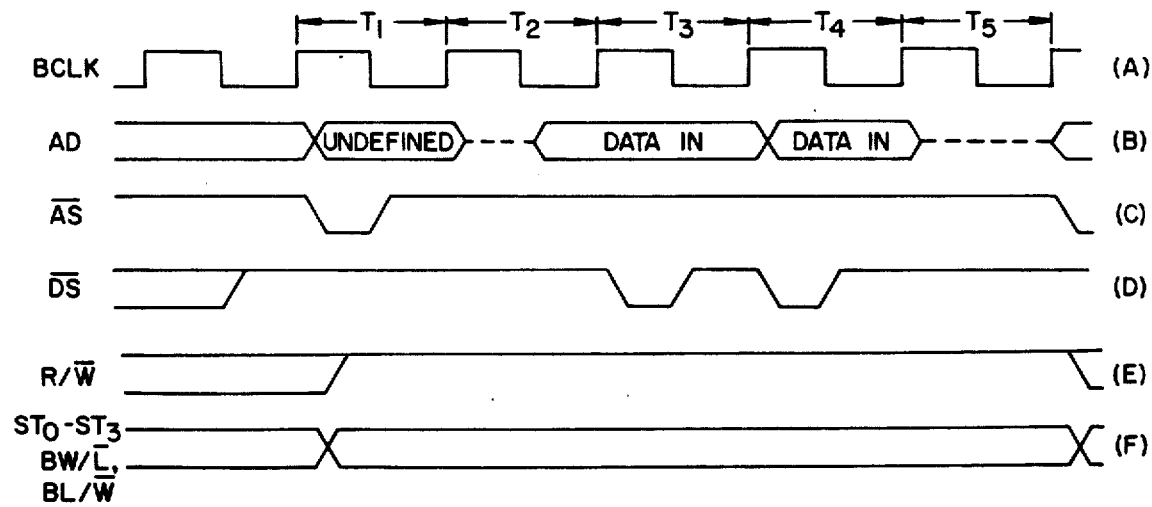
FIG._13.
(CPU-EPU DATA READ TIMING)

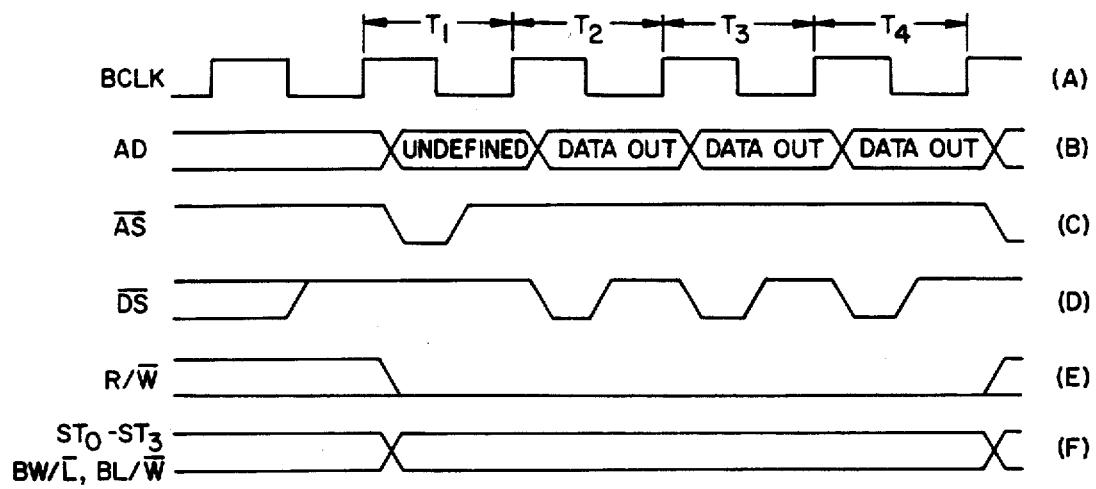
FIG._14.
(EPU DATA WRITE TIMING)
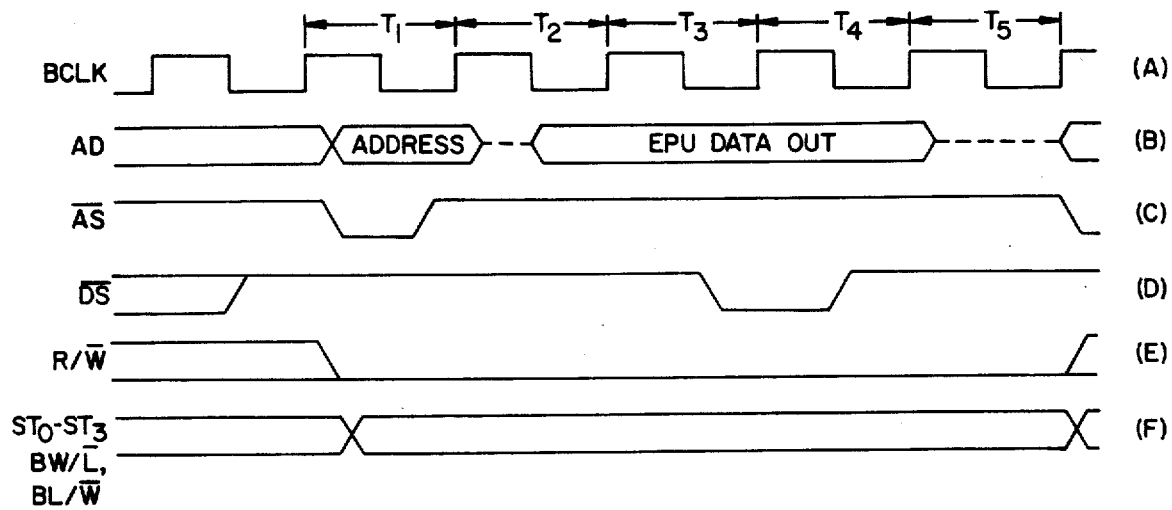
FIG._15.
(EPU-TO-MEMORY DATA WRITE TIMING)

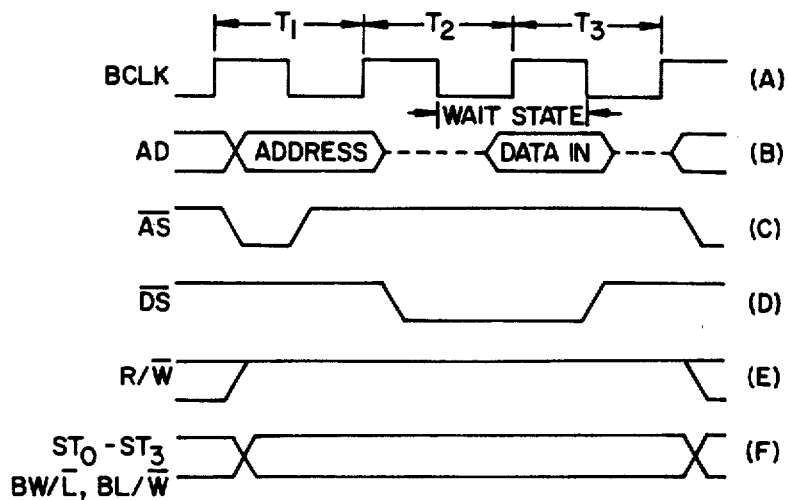
FIG._16.
(MEMORY-TO-EPU DATA WRITE TIMING)
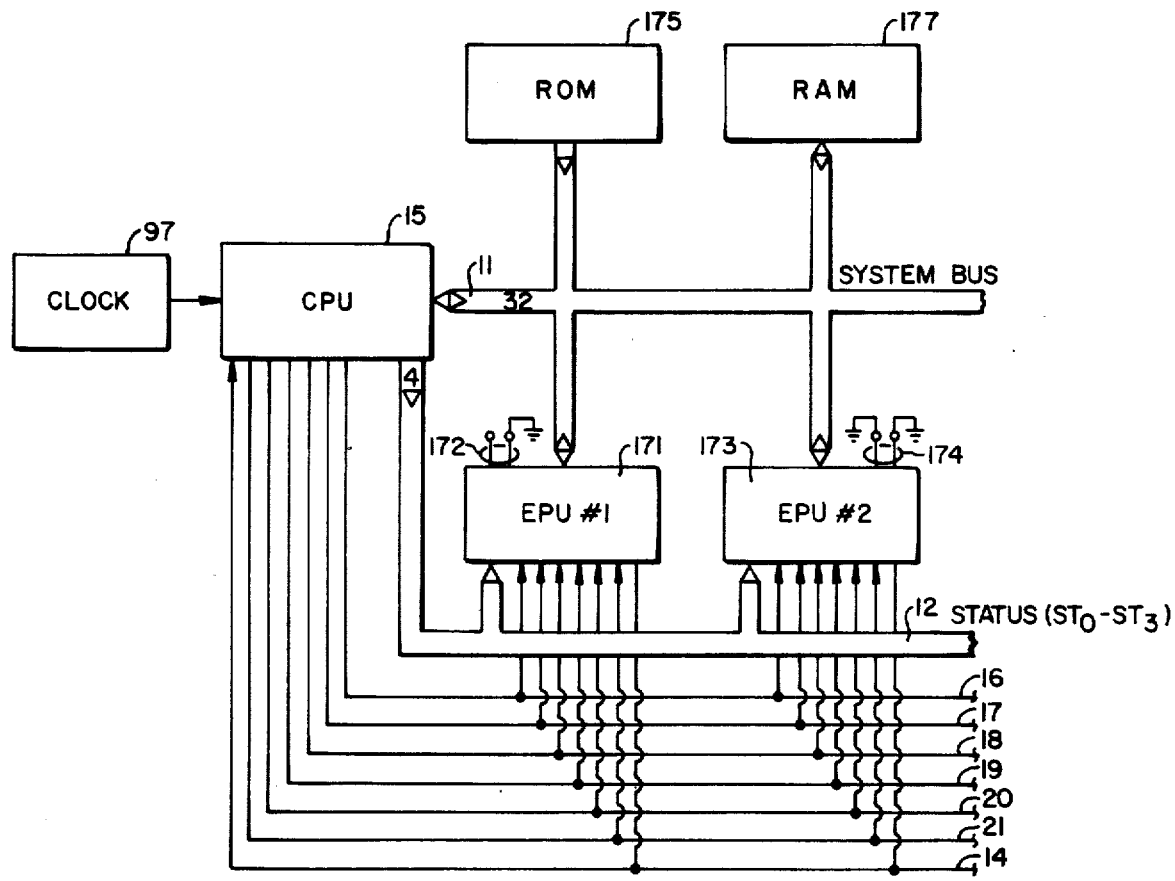
FIG._17.

BUSY SIGNAL INTERFACE BETWEEN MASTER AND SLAVE PROCESSORS IN A COMPUTER SYSTEM

BACKGROUND OF THE INVENTION

This invention relates generally to integrated circuit (I.C.) computer component chips, and particularly to high performance chips.

The development of single integrated circuit chip microprocessors and microcomputers has been rapid since their initial introduction in the early 1970's. The first generation of such devices processed four bits of data at one time, followed quickly by an eight-bit processor. More recently, 16-bit processors have become commonly used, and 32-bit processors are coming to the market. One primary goal in the evolution of processors is to maximize their performance (i.e. the speed of operation, capability and flexibility to the user) on a single chip that is small enough that manufacturing yields of the chip are sufficiently high.

To further increase processor performance, separate dedicated processing chips are often provided in a system with a controlling microprocessor or microcomputer. The tasks to which the second processor is dedicated are thus performed extremely fast. A computer system designer can select a dedicated processor to perform one of several specific functions with high performance but without having to increase the size or complexity of the controlling microprocessor or microcomputer integrated circuit chip.

It is a primary object of the present invention to provide improved cooperative architecture of a central processing unit (CPU), the controlling master processor, and of an extended processing unit (EPU), the dedicated slave processor (co-processor), in a manner that improves overall performance of a computer system using such a combination.

SUMMARY OF THE INVENTION

This and additional objects are accomplished by the various aspects of the present invention, wherein, according to one aspect thereof, the EPU generates a busy signal under controllable circumstances which is communicated to the CPU. The EPU has a plurality of queuing registers to temporarily store instructions and data in an order to be executed by the EPU. As one instruction is executed, that instruction and its data are moved out of the register, the next instruction in line being readied for execution. The EPU is programmed by the user to generate the busy signal when only one, two or even three queuing registers are filled, thereby giving the user control over performance (which is maximized by allowing all the queuing registers to be filled) and the exception and error handling capability of the EPU (which is simplified by minimizing the number of queuing registers that are maintained full). This use of queuing registers allows increased performance by permitting the EPU to execute an instruction while the next instruction(s) to be executed is pre-fetched along with its data. This also increases performance by allowing the CPU to continue processing other instructions.

The CPU can also be programmed by the user, according to another aspect of the present invention, to act in different ways upon receiving the busy signal from an EPU. In one programmable state, the CPU will remain stopped whenever there is a busy signal from the EPU. In another programmable state, the busy signal is ignored until a new instruction for an EPU is encountered, thus allowing the CPU to continue simultaneous execution of other instructions. This programmable CPU feature also allows the user to choose between maximizing performance, wherein the busy signal is ignored, and to make it easier to recover from a fault or exception, wherein the busy signal being observed.

The various aspects of the present invention described herein are being commercially embodied in the Z80,000 central processing unit and Z8070 arithmetic processing unit (floating point processor) of Zilog, Inc., Campbell, Calif., assignee of the present application. The following publications of Zilog, Inc. that describe these products are expressly incorporated herein by reference:

1. "Z80,000 CPU—Preliminary Product Specification", September 1983;
2. "Z8070 Z-APU Arithmetic Processing Unit—Preliminary Product Specification", September 1983; and
3. "Z80,000 CPU Technical Manual".

Additional objects, features and advantages of the present invention will become apparent from the following description of a preferred embodiment thereof, which description should be taken in conjunction with the accompanying drawings.

BRIEF DESCRIPTION OF THE DRAWINGS

FIG. 1 is a block schematic diagram of a single chip central processing unit that utilizes certain aspects of the present invention;

FIG. 2 is a flow diagram showing the operation of the central processing unit of FIG. 1;

FIG. 3 illustrates the format of two control registers of the central processing unit of FIG. 1;

FIG. 4 illustrates the operation of the translation lookaside buffer of FIG. 1;

FIG. 5 lists protection bit patterns of a few physical frame attributes as shown in FIG. 4;

FIG. 6 is a block schematic diagram of a single-chip extended processing unit that utilizes certain aspects of the present invention;

FIG. 7 is a circuit diagram of a portion of the extended processing unit of FIG. 6;

FIG. 8 illustrates the format of a control register of the extended processing unit of FIG. 6;

FIG. 9 shows the bit pattern of instructions that are executed by the extended processing unit of FIG. 6;

FIG. 10 is a flow diagram showing that portion of the operation of the central processing unit of FIG. 1 that interfaces with the extended processing unit of FIG. 6;

FIG. 11 shows that portion of the operation of the extended processing unit of FIG. 6 that interfaces with the central processing unit of FIG. 1;

FIGS. 12, 13, 14, 15 and 16 are timing diagrams of various cooperative operations between the central processing unit of FIG. 1 and the extended processing unit of FIG. 6; and FIG. 17 shows a block diagram of a typical computer system that utilizes the central processing unit of FIG. 1 and the one or more extended processor units according to FIG. 6.

DETAILED DESCRIPTION OF A PREFERRED EMBODIMENT

Referring to FIG. 1, the architecture of a 32-bit central processing unit integrated circuit chip is shown in block schematic diagram form. The circuit chip illustrated in FIG. 1 is, of course, packaged in some appropriate way (not shown) with conductive pins extending from the package and connected to the circuit chip. A few of the external pin connections are shown in FIG. 1. A 32-pin address/data bus 11 (AD), connected to interface circuits 13 on the chip, serves to carry addresses and data between the chip and external components. The bus 11 is time shared between address and data information. An example computer system shown in FIG. 17 utilizes a central processing unit (CPU) 15 which is that being described with respect to FIG. 1. In addition to the AD bus 11, there is a status bus 12 ($ST_0$-$ST_3$), and seven single conductor control lines 14, 16, 17, 18, 19, 20 and 21. The two buses and control lines are shown to communicate between the chip of FIG. 1 and other components of a system such as illustrated in FIG. 17. Of course, there are many other control lines for other functions that are not shown in the drawings.

A 32-bit bus 23 is provided on the chip for communication of addresses and data between the interface circuits 13 and other circuits, as shown in FIG. 1. One of these circuits is a cache memory 25. Also, an input data buffer register 27 and an output data buffer register 29 are provided for temporary storage of data either being brought into the circuit of FIG. 1 from an external memory or other device, or data that is being communicated out to external devices, respectively. The interface circuits 13 are controlled by interface control circuits 31 that are connected therewith through a small control bus 33.

In the CPU architecture of FIG. 1, the cache memory 25 stores on the chip the most often used of the program instructions and data that normally reside in external memory, such as a read only memory 175 and random access memory 177 shown in FIG. 17. The time required to access these instructions and data is thus significantly reduced since, without the on-chip cache memory 25, several clock cycles worth of time are required to access and fetch data from external memory. The cache 25 responds to an address on a physical address bus 39. By a "physical" address is meant that actual address of the instruction or data in external memory. Data and instructions are stored in the cache 25 with the same physical address as in external memory. In response to such an address on the bus 39, an instruction to be retrieved appears on an input instruction bus 41 from the cache memory 25. Alternatively, a physical address of data is presented on the bus 39, that data is placed on the internal bus 23 through a bus connection 43. The data is thus made available for use by other components of the processor by communication through the input data buffer 27. The physical address of a desired instruction in the cache 25 is generated by a physical program counter 45. A physical address of data to be read out of the cache 25 is generated by other elements described below.

When a program instruction is read out of the cache 25 onto the instruction bus 41, it is applied to an instruction decoding circuit 47 and one input of an arithmetic logic unit 49 that is dedicated to the function of calculating the logical memory address of data that is necessary to be retrieved in order to carry out the instruction on the instruction bus 41. By "logical" address is meant that location of the data which is specified in the control and programming instructions, not the physical location of the data in external memory. It is a logical address that is the result in a logical address bus 51 of an address calculation by the ALU 49.

As is well known, computer programmers deal with logical addresses and leave it to the executing processor to translate the logical addresses into the physical memory addresses necessary for accessing the data. A logical/physical translation table is stored in external memory for any particular program. The most frequently used portion of that table is stored in a memory management unit 53. In response to a logical address in an input 55 of a logical memory page desired to be accessed, the memory management unit 53 provides at an output 57 a physical address of the memory frame where that data exists. As described below with respect to FIG. 4, this physical page address in the output 57 is combined with offset bits of a logical address through a bus portion 59 that bypasses the memory management unit 53. The bus portion 59 further allows bypassing the memory management unit 53 altogether when executing a program where the logical addresses can be made equal to the physical memory addresses, such as in industrial control applications. By having the most recently used portion of the logical/physical address translation table from the external memory on the chip itself, access time for making the translation is reduced. Additionally, since certain attributes of the data are also stored as part of the physical address in the translation table, access to these attributes is made much faster so that a prompt response to them can be had.

The cache memory 25 and the memory management 53 are similar in that they store on the chip the most frequently used portions of information stored in an external memory. The cache 25 stores program instructions and data (operands), while the memory management unit 53 stores a portion of the logical/physical translation table in external memory. They both operate to read their respective pieces of information from external memory into their own memory if that information is not already there when access is desired. The new information replaces the least recently used information in their respective memories. The structure and operation of these circuit portions is explained in greater detail below.

One output 61 of the circuit 47 that decodes an instruction in the instruction bus 41 is applied to the physical program counter 45. This path is utilized when a decoded instruction requires the program counter 45 to be jumped to a new program address. As is well known, the program counter generally increments sequentially for accessing successive instructions that are organized in order in memory. Such jump commands are also applied to a logical program counter 63 that maintains the logical address of the instruction for relative addressing, or in case there is some exception, fault or malfunction that requires the circuit to remember what the logical address was in the previous step.

Another output 65 of decoding circuits 47 is applied to circuits 67 which control the operation of the address ALU through a short control bus 69. The address ALU control 67 is one of three circuit portions shown in FIG. 1 that controls the operation of the processor. The interface control 31 has already been mentioned. Another is a control circuit 71, connected to the decoding circuits 47 through a control bus 73, which controls the operation of a second arithmetic logic unit 75 through a control bus 77. Each of these controlling circuits may conveniently be a suitable logic array.

In order to temporarily store data, a number of general purpose registers 79 are provided on the chip. These registers can be accessed to read their contents at any one of three outputs. One output 81 provides a second input to the address ALU 49. The output bus 81 is also connected to two control registers 83 that are particularly associated with the address calculation function of the ALU 49. The count of the logical program counter 63 is also made accessible through the bus 81 by that second input of the address ALU 49. Additionally, the existing logical address at the output 51 is connectable by a bus segment 85 to that second input and is utilized when the control circuit 67 determines that the logical address output is required for calculating the next data address.

A second output 87 of the general purpose registers 79 is connected to one input of the arithmetic logic unit 75. The function of the ALU 75 is to perform on two sets of data presented to it the arithmetical calculation specified by the control circuits 71 which executes a previously fetched program instruction. A second input to the ALU 75 is a connection with a bus 89 that is the third output of the general purpose register 79. That connection is also an input to the registers 79 which allows new data to be written into them. A bus segment 91 is connected between an output of the ALU 75 and the bus 89. This connection allows the ALU 75 output to be stored in one of the general purpose registers 79 or to be sent by way of the output data buffer 29 to external memory. A group of control registers 93 are also connected to the bus 89 in a manner that information can be read from them or written into them through that bus.

The format and content of two of the control registers 93 are illustrated in FIG. 3. FIG 3(A) shows the flag and control word (FCW) and the hardware interface control register (HICR) as shown in FIG. 3(B). A small bus 95 communicates the contents of the HICR register to the interface control circuits 31 for its use, as described below.

The operation of the entire circuit of FIG. 1 is controlled, as is usual, by an external clock, such as a clock circuit 97 of FIG. 17. In a specific form, the clock operates at a 10 MHz rate. Two clock cycles are included in each processor cycle. Therefore, the processor operates at a rate of 5 MHz.

The processor described with respect to FIG. 1 has a pipelined architecture. That is, a number of operations are performed simultaneously in order to increase the overall performance of the processor. In this particular example, six processing stages are provided in the pipeline. The pipeline stages can be summarized as follows:

1. Instruction Fetch: A program instruction is read out of the cache memory 25 onto the bus 41. If the desired instruction is not in the cache memory 25, it is first obtained from external memory.

2. Instruction Decode: The controlling program instruction obtained in Step No. 1 above is decoded by the circuits 47 in order to control the various other portions of the system in a manner to carry out the instruction.

3. Address calculation: In response to the decoded program instruction and other information in the registers, the address arithmetic logic unit 49 calculates a logical address of an operand (data) that needs to be fetched or stored for carrying out the fetched instruction.

4. Operand (data) Fetch: During this step, the data whose address was calculated in the previous step is fetched from the cache memory 25, and the if not in that memory, first loaded from external memory. The data becomes available in the input data buffer 27 for use in the next processing step.

5. Execution: The fetched data in the buffer 27 and other data in an appropriate general purpose register 79, depending upon the instruction being executed, are processed by the ALU 75 (multiply, divide, add, etc.) in a manner specified by the program instruction.

6. Operand Store: The result of the calculation by the ALU 75 is then stored, generally being written into the output buffer 29, thereafter written to external memory through the system bus 11, and possibly also to the cache memory 25.

Therefore, in six steps, a program instruction is fetched, executed, and the result stored back in an appropriate memory or register. At any one time, six such operations are going on at once, each of the six stages handling one of the steps in executing a different program instruction. For example, the operand is being fetched (Step No. 4) in executing one instruction, and the operand address is being calculated (Step No. 3) for the next succeeding program instruction.

As is more apparent from the detailed description of the processor's operation with respect to FIG. 2 that follows, each pipeline stage function is accomplished in one processor cycle, except in certain cases. One such case is where the external memory needs to be accessed to bring into the cache 25 or memory management unit 53 information from the external memory. Another is where the program instruction itself is so complicated as to require more than one cycle of processing time. Another exception is with branch instructions, where the next instruction cannot be entered into the pipeline until the branch instruction has been completely executed. Another example of an exception is when data that is a result of executing one instruction must be read as part of the address calculation in the execution of the next instruction. Hence, the result of such an exceptional circumstance is to stop the pipeline processor for a time. The processor architecture and its manner of operation is designed to minimize these occurrences so that its performance approaches the ideal of accomplishing the execution of one instruction per processor cycle.

Before describing operation of the processor of FIG. 1 with respect to the flow diagrams of FIG. 2, additional details of the structure and operation of the cache memory 25 and memory management unit 53 are provided.

The cache memory 25, in this specific example, is designed to hold 16 blocks of information, the information in each block being program instructions or data. This information is stored in a memory 101 wherein each block is 128 bits long. In addition, there are eight validity bits for each block in an associated memory 103. That is, there are 16 bytes of instructions or data in each block in the memory 101, and one validity bit in the memory portion 103 is associated with each two bytes. Twenty-eight bits of the physical address for each block of instructions or data in the memory 101 are contained in the memory 105 which additionally contains a validity bit for each block in a memory portion 107. Memory 105 is of an associative type, which means that an output will be obtained in one of the 16 output lines 109 (one line for each of the 16 blocks of information) if an address in an input 111 matches that of any one address in the memory portion 105. The output in one of the lines 109 then serves to enable the memory portion 101, so that data is read out through bus connection 43 and instructions are read out through a bus 113 into an instruction register 115 for temporary storage. The first four bits of the physical address, bits 0-3, are applied to a bus portion 117 from the physical address bus 39 to the memory portion 101 to select the portion of the information block in that memory that is to be read out through either of the buses 43 or 113. The remaining bits of the 32-bit physical address are applied from the physical address bus 39 to the bus 111 that is connected to the associative memory 105.

An OR-gate 119 has the 16 lines of the bus 109 as its inputs. Whenever there is a positive comparison between the physical address in the bus 111 and one of the 16 stored in the associative memory 105, an output in the line 121 of the OR gate 119 will indicate a "hit". That is, it indicates that the physical address on the bus 111 exists in the memory 105, and that a block corresponding to that address exists in memory 101. A signal in the line 127 indicates whether the addressed instruction or data in that block is valid or not. If a signal is not detected in either of the lines 121 or 127 when a physical address is applied to the associative memory 105, that means that the desired information is not in the cache memory since none of the lines 109 will indicate it. When the interface control circuits 31 detect a "miss" in either of the lines 121 and 127, then the desired instruction or data is first loaded into the cache memory 25, as explained below with respect to the flow diagrams of FIGS. 2 and 3. When this occurs, a stack memory 123 is utilized, being connected to the memory portions 101, 103 by a bus 125. The buses 109 and 125 are connected. The stack memory 123 contains a four-bit word for each of the 16 blocks of information in the cache memory. Each of the 16 blocks of data in the memory has a unique four-bit code in the stack. The stack is reordered each time the cache memory 25 is accessed so that the code for the most recently accessed block of data is on the top of the stack. Therefore, when there is a need to bring instructions or data into the cache memory 25, the bottom code in the stack 123 is looked at as an indication of the block of the cache memory in which the new information may be stored, thus replacing the least recently used information in the cache memory. This technique is in accordance with the known "least recently used" (LRU) algorithm used in cache memories.

The memory management unit 53 is, according to the preferred embodiment, a translation lookaside buffer that operates in a manner very similar to that of the cache memory 25. An address associative memory 131, along with a validity tag memory 133, receives the logical page address in the bus 55. If there is a match between that logical page address and one in the memory 131, one of the 16 lines 135 is enabled, thereby specifying the physical frame address to be outputted onto the bus 57 and thence to the physical address bus 39. The information contained in the memory 137 is the physical frame address corresponding to the logical page address in the memory portion 131, each of the 16 stored translations having been obtained from the logical/physical translation table of external memory. These memory portions are connected by a bus 143 to a four-bit wide stack 145 that operates in the same manner as described with respect to the stack 123 of cache memory 25. The buses 135 and 143 are directly connected.

When a logical page address presented on the bus 55 is found in the associative memory 131, an output in the line of the bus 135 for that particular block causes a positive output in the line 141 of an OR-gate 139. This output is used by the ALU control circuit 71. This records a "hit". Similarly, if a "miss" occurs, the logical/physical conversion for a logical page of address is read in from the external memory into the block space of earlier portions 131 and 137 that has been least recently used, thus displacing an infrequently used translation table.

The function of the TLB 53 is shown in FIG. 4. The logical address word 147 appears in the logical address bus 51 of FIG. 1. The offset bit Nos. 0-9 are passed directly by ten lines of the bus 59 of FIG. 1 to form offset bits 0-9 of a physical address word 149 as shown in FIG. 4. That is, the offset bits of the logical address are not translated but directly become the offset bits of the physical address word 149. The page address bits 10-31 of the logical address word 147 (FIG. 4) are communicated by the bus 55 to the associative memory 131 of FIG. 1. A corresponding physical frame portion (bits 10-31) of the physical address is outputted in the line 57. Bits 30 and 31 of the physical address have special control functions described below, but the remaining bits 10-29 specify the physical frame of the external memory in which the desired instruction or data resides.

Carried in an attribute memory 138, as part of the physical frame word, are six bits of attributes, as illustrated in word 151 (FIG. 4). These are control bits which are used in the operation of the circuit, as described below. The attributes word 151 is communicated over bus 140 from the memory 138. The information contained in the four protection bits of the attributes word 151 is given in the table of FIG. 5. The result is to protect specified physical address frames of information in the external memory from access, reading or writing, in various combinations given in that table.

Operation of the processor of FIG. 1 in some detail can best be understood by reference to the flow diagram of FIG. 2. The flow diagram of FIG. 2 is divided into six parts, one describing each of the processor pipelined stages. The first function, executed by the first pipeline stage, is to fetch an instruction (part of a controlling computer program provided by the user of a computer system using the processor 15) to be executed. A first step 201 causes the physical program counter 45 to be incremented to the next address. It is then decided, at a step 203, whether the instruction at that physical address is capable of being temporarily stored in the cache memory 25. For example, the instruction will not be stored in cache memory if the NC bit is set in the attributes word 151 for the instruction's memory page. If it is an instruction which uses a cache memory 25, a next step 205 asks whether the physical address of the program counter 45 matches an address within the associative memory 105 of the cache memory 25. If so, a next step 207 is to check whether the data validity bits in the memory portion 103 for the address block of data are set. If so, the instruction at that physical address is read from a block of data stored in the memory 101, at a step 209. At that point, the instruction register 115 contains the instruction and the function of the first pipeline stage has been completed. The instruction is now presented on the bus 41. A subsequent pause at a step 211 may occur if a subsequent stage of the pipeline processor is not ready to perform the next step.

There are two alternative paths in the instruction fetch machine cycle to that just described. One alternative path will be taken if it is determined at step 203 that the instruction is the type which is not to be placed in cache memory. If not, the instruction is fetched directly from the external memory, as indicated by block 213. It is then loaded from bus 43 through an internal bus (not shown) of memory 101 to bus 113 and then directly into the instruction register 115, with the same result as before; that is, the instruction is placed on the instruction bus 41 by the function of the block 215, in order to be ready for the next pipeline stage.

The second alternative path initially begins at step 205 if it is determined that there is no physical address in the cache memory 105 that matches that of the program counter 45. In this case, the instruction must be loaded from external memory. A first step 217 of this process determines from the stack 123 the block of instruction or data information in the cache memory 25 that has been least recently used. This is then the block of information that is going to be replaced with information from the external memory that includes the desired instruction. The physical address of the program counter is then loaded into the associative memory 105 and the validity tag bit in the memory portion 107 associated with that memory block is marked valid. This occurs in a step 219, followed by a step 221 in which the validity bits for that block of data are cleared from the memory portion 103. This latter step then indicates that the information in that block of the memory 101 is not good information.

The step 207 is then encountered, and since the validity bits in the memory 103 have been cleared, the answer to the question 207 is "no". A step 223 then fetches the desired instruction from external memory. At step 225, this instruction is loaded into the cache memory portion 101. Subsequently, in step 227 the validity bits in the memory portion 103 are set for that instruction. The instruction is then read from the cache by a step 209, as explained above.

Therefore, no matter which of the three paths is followed in the initial pipeline stage operation, the result is the same: an instruction is fetched from the memory, either external or on-chip cache, and loaded into the instruction register 115 so that it appears on the instruction bus 41. The next step for that instruction is indicated by the instruction decode cycle of FIG. 2. The instruction decoding circuits 47 decode the instruction on the bus 41, as indicated by a step 231 of FIG. 2. As indicated by step 233, the decoded instruction is formed into control words on the control buses 65 and 61 for advancing the logical and physical program counters 45 and 63, and to specify through the address ALU control circuitry 67 the function that is to be performed by the address ALU in a next processor cycle. A possible wait state 235 is provided in case the next processor stage is not ready to continue with this instruction.

While the instruction decode cycle of steps 231 and 233 is being accomplished on the first instruction, the instruction fetch machine cycle previously described is operating on the next instruction to be executed. That is, there is simultaneous operation of these two pipeline stages (and the other four as well) of the processor according to different instructions, thus increasing the speed of operation.

The third processor pipeline operation is the address calculation cycle, as illustrated in FIG. 2. A first step 237 of this cycle is to determine whether the instruction that has been previously decoded requires that data be fetched from memory. If not, the address calculation is avoided and the steps dropped down to an optional waiting state 239 such as is provided at the end of each of the other pipeline cycles. If memory data is required, a next step 241 determines the inputs of the address ALU 49. One input can be certain fields of the instruction itself from the instruction bus 41, such as those specifying addresses and/or displacements. The other is placed on the bus 81 from any of several sources, including one of the general purpose registers 79, the logical program counter 63, or one of the control registers 83. These inputs are specified by the instruction itself and the control words decoded from it. A next step 243 is for the address ALU 49 to calculate the logical address of data to be fetched. That address appears on the logical address bus 51.

Once the logical address of the desired data is known, a decision 245 is made as to whether address translation by the TLB 53 is necessary. It will normally occur, but in cases where the logical and physical addresses are made to be the same, the processing jumps to the end of the address calculation cycle before the wait state 239. In the usual case, the processing proceeds to a step 247 where the logical address previously calculated and placed on the logical address bus 51 is compared with that of the associative memory 131 of the memory management unit 53. If there is a positive match, the next step 249 reads the frame address onto the bus 57 and thus forms the complete 32-bit physical address word 149 as illustrated in FIG. 4, on the physical address bus 39. The protection bits 3-7 of the physical attributes, as stored in the TLB 53, are then examined in a step 251. If the data at the calculated physical address is protected against reading by the code in those bits, the processing stops by reference to a process page fault 253. The operating system must then take over. If the protection attribute bits do not prohibit the desired read, however, then the processing proceeds. At the end of the third stage of the pipeline processor, therefore, the physical address of the data to be fetched in accordance with the previously decoded instruction exists on the physical address bus 39.

However, if there is no match in the associative memory 131 in the step 247, that portion of the translation table must be read into the TLB 53 memory from external memory. A first step 255 of this process is to determine from the stack 145, in accordance with the least recently used algorithm, the translation entry in the memories 131 and 137 that has been the least recently used. A next step 257 is to fetch that entry of the translation table from the external memory. At step 259, the validity of the page table entry as received from external memory is determined by examining a bit controlled by the operating system. An invalidity will cause a process page fault 253 from which the operating system must recover the process.

If the page table entry is determined to be valid in step 259, a next step 261 loads the logical page address into the TLB memory 131 and it is marked valid in the memory portion 133. Next, the physical frame of the translation table in external memory associated with that logical page address is loaded in the TLB memory 137 in the same block as the logical address. From then on, the process is the same as described previously, going through the steps 249, 251 and the wait state 239, if necessary.

The next step of the processor, in the fourth pipeline processor stage, is to fetch the operand (data) from the external memory at the physical address calculated by the immediately preceding processing cycle. The first question 265 is whether the instruction requires any data from memory at all. If not, the processing jumps toward the end of the cycle to a step 267 wherein a control word for the execution ALU is generated from the decoded instruction previously obtained in order that the ALU will know for the next processor cycle what it is to do with the data presented at its input.

If the instruction does require fetching data from external memory, a question 271 is asked as to whether the data at the determined physical address can be loaded into the cache memory 25. For example, the data will not be stored in cache memory if the NC bit is set in the attributes word 151 for the data memory page. Also, if the bit 31 of the physical address (the I/O data bit of the physical address 149 of FIG. 4) is in one state, it indicates that the data is in an input/output device rather than memory, and the data is not brought into the cache since it is subject to change. If non-cachable, processing jumps to a step 273 wherein the data is fetched from the external memory and a next step 275 loads that data into the temporary input data register 27. The processing then jumps to the step 267, as previously described.

The step 271 also checks the value of bit No. 3 of the physical attribute word 151. This bit is set to indicate when the addressed frame of data is also accessible by another processor. If it is, the frame is not loaded into the cache memory 25 and the processing jumps to step 273.

If at the step 271 it is determined that the data may be in the cache, the same processing as previously described in the first instruction fetch machine cycle of FIG. 2 is accomplished, except that data is being loaded from the external memory into the cache in this fourth processor cycle while an instruction was being loaded in the first processing cycle. The blocks of FIG. 2 in the fourth cycle that have functions corresponding to those of the first cycle are marked with the same reference number, but with a prime (') following the number. At the conclusion of that common routine, the data is in cache and subsequent step 274 reads the data at the previously calculated physical address from the cache memory 101 into the temporary input buffer 27.

At the end of the fourth processor cycle, it can be seen that the execution ALU 75 is ready to execute the instruction. The control signal which tells the ALU 75 what calculation is to be made has been formed and presented by the execution ALU control 71 in a step 267. Any external data necessary to execute the instruction is now resident in the input data buffer 27. Therefore, a first step 276 of the execution cycle (the fifth processor cycle) is to select the two inputs to the ALU 75. If data has been fetched from the external memory, one of those inputs is most likely to be that external data through the bus 89. Another input is most commonly the contents of one of the general purpose registers 79. The ALU 75 then calculates the resultant operand in a step 277, and that result is presented on its output bus 91.

A final step 279 of the execution cycle is to write this resultant operand either into one of the general purpose registers 79 or into the temporary output data buffer 29, in response to the particular instruction being executed. A wait state 281 is optionally provided at the end of the execution cycle as well.

The sixth and final processor step is to store the operand that results from the ALU 75 calculation. A step 283 calls for setting the flags in the flag and control word (FCW), as illustrated in FIG. 3(A). The FCW word is stored in a dedicated control register within the control registers 93. The stored flags are of a standard type, pertaining to the sign of the resultant operand, whether there is a carry, and so forth.

A next step 285 is to determine whether the resultant operand calculated by the ALU 75 is to be written to external memory. If not, the process is ended. If it is to be written to external memory, a step 287 which follows does so. A next step 289 is to determine from the physical address bit 31 of the data being written to external memory whether it is of the type that may be stored in the cache memory 25. If not, the cycle ends. But if the data may be stored in the cache memory 25, a further step 291 compares the physical address of the data being written into external memory with that in the associative memory 105 of the cache 25. If there is no positive comparison, that means the data at the location just written into external memory does not also exist in the cache. But if there is a positive comparison, this shows the necessity to update the cache so that the data in it at that physical address is the same as that in the external memory at that address. Thus, after checking to see whether the data validity bits are set, in a step 293, a step 295 writes the data into the cache memory 101 so that it will correspond with the updated information in the external memory. With that, the six individual processing cycles are completed for one controlling program instruction. The process has ideally taken six processor cycles of two clock cycles each, but could be longer under conditions previously described. In any event, all six processing cycles described are operating simultaneously on six different items, either simple program instructions or portions of complex instructions.

The operation of the CPU chip described with respect to FIG. 2 assumes that the CPU itself will carry out the entire execution of each controlling instruction. In addition to this, it is also highly desirable, in order to improve performance even more, to provide the ability of the CPU to work with one or more co-processors (alternatively referred to as slave processors or extended processing units (EPUs)). One or more EPUs are advantageously used with a controlling master CPU for performing very specific operations at an extremely high rate of speed. Examples of typical EPU functions include floating point calculations, digital signal processing, and graphic display processing. The overall performance of a computer system is optimized with use of one or more EPUs as appropriate.

Referring briefly to FIG. 17, such a computer system is illustrated, wherein two separate EPUs 171 and 173 are connected to the CPU 15 by various control lines, the status bus and the system bus. Two control pins 172 of the first EPU 171 are appropriately grounded to provide an electrical address identification of that EPU. Similarly, the second EPU 173 has two control pins 174 which are appropriately grounded to give that EPU a unique address.

The system of FIG. 17 will also include other commonly used computer system elements, depending upon the application, including a read only memory 175 and a random access memory 177. Each of these, and any additional elements connected to the system bus, will also have the status lines and various other control lines shown in FIG. 17 connected to them. Other circuits that might be connected to the system bus 11 include a serial communications controller which interfaces video display terminals and modems, a universal peripheral controller which interfaces additional peripherals, a counter/timer and parallel input/output circuit, a first-in, first-out input/output circuit, a direct memory access circuit, additional central processing units, as well as others that are commercially available.

Detailed operation of the CPU of FIG. 1 in controlling an EPU on the system is described below with respect to the operational flow diagrams of FIG. 10. The specific CPU and EPU architecture being described contemplates the use of up to four EPUs. The format in the CPU of FIG. 1 of a program instruction adapted for execution by an associated EPU is shown in FIG. 9. The instruction is 32 bits in length, being shown as a first 16-bit word 301 and an immediately following second 16-bit word 303. A two-bit field 305, being the least significant bits of the first word 301, identifies the EPU for which the instruction is intended. A field 307 contains the operational code which is unique for EPU operations. That is, a particular operation code 307 is designated for the CPU and EPU to recognize those instructions that are intended to be executed by an EPU. The actual operation of the EPU is defined by an EPU instruction field 309. If the instruction involves transfer of data to or from the EPU, the length of that data, in terms of number of words or bytes, is specified by a field 311. As explained later, the CPU places each instruction intended for an EPU on the system bus 11 and the intended EPU compares the identification code field 305 of that instruction with its address identification and, if intended for it, loads it into its register and executes the EPU instruction as specified by the field 309. If data is to be transferred between the EPU and external memory, such as the RAM 177 of FIG. 17, the CPU controls the transfer directly between those two elements and does not pass the data through the CPU.

Referring to FIG. 6, a block diagram of a typical EPU interface is given. A data processing block 315 is indicated to include whatever desired specialized calculation is intended, such as floating point calculations. It is not the purpose of this description to describe any particular processing operation performed by the EPU but rather to illustrate the details of the interface between data processing circuits 315 and the CPU 15, and to describe how the CPU and EPU circuits work together to improve the overall performance of the computer system.

A system bus 317 is provided on the EPU chip for communication among its main components. The system bus 11 and the internal bus 317 are connected by a portion 319 of interface circuits which are controlled by signals in a control bus 321 from a primary interface circuit 323. A separate portion 325 of the interface circuits is shown to generate the EPUBSY signal on the output line 14 from a related signal in a line 327. The status bus and control lines shown connected to the interface circuits 323 are those previously discussed which are connected to the controlling CPU 15. The two conductors 172 terminate in pins on the outside of the EPU integrated circuit package for selective grounding to provide the CPU an address that identifies the specific EPU in a system that potentially uses more than one EPU circuit chip.

Instruction and data inputs to the data processing unit 315 are provided by a plurality of queuing registers 329. The number of registers illustrated is two but could be a different number for particular applications. Each register, in this example, is capable of holding a 32-bit instruction, 80 bits of data, 32 bits of a logical program counter, and one validity bit, as shown in FIG. 6. The data and program counter information loaded into a particular register is maintained to be that associated with the instruction in that register. The purpose of each of the validity bits V1 and V2 of these two registers is to provide an indication of whether the particular register is filled with valid information.

An instruction in line to be executed by the data processor 315 is communicated with it through a bus 331, and its associated data through a bus 333. Typically, when the data processing circuits 315 are ready to execute a new instruction, the oldest within the registers 329 is loaded into the processor 315 along with its associated data that has already been assembled and placed in the same register. This then frees up a register that can be loaded through the system bus 317, under control of the CPU 15, with another instruction and its associated data to be maintained in line for execution by the processing circuits 315. Of course, if the queuing registers 329 are empty when an instruction and its data have been received, such will go directly to the data processor 315.

The interface circuits and operation being described are controlled by an interface control circuit 335, preferably constructed of a programmable logic array that steps the various circuit portions of FIG. 6 through their sequential operations as described below. A system configuration register 337, whose contents are illustrated in FIG. 8, is loaded by the user of the system, to select among certain operating options that are provided. The contents of the OVRLP field (bits 18 and 19) of the register 337 are shown to be communicated to the interface control circuits 335 by two conductors 339.

The circuit for generating the EPUBSY signal to tell the CPU 15 when the EPU is busy, is illustrated in FIGS. 6 and 7. A multiplexing circuit 341 has a total of six inputs, in this specific example, conductors 343, 345 and 347 from the interface control circuits 335. Another three inputs to the multiplexor 341 is a line 349 from the data processor 315 which indicates when it is busy, a line 351 from the queuing registers 329 indicating when the validity bit V1 is set, and a line 353 which indicates when the validity bit V2 is set. The output 327 of the multiplexor 321 comes from a three input OR gate 355, each of its inputs being an output from respective AND gates 357, 359 and 361.

It is apparent from FIG. 7, therefore, that the EPU busy signal in output line 14 is generated under one of the following three circumstances:

(1) Any time the data processing circuits 315 are busy, regardless of how much room there is in the queuing registers 329 (OVRLP bits being sent to 00): AND gate 357 is turned on by a signal in the input line 343, while each of the AND gates 359 and 361 are turned off by a lack of a signal in the lines 345 and 347.

(2) When one instruction and its associated data are stored in a first of the queuing registers 329 (OVRLP bits being sent to 10): the AND gate 359 is turned on by a signal line 345, while the other two AND gates are maintained off.

(3) The busy signal is given only when the queuing registers 329 are completely full (OVRLP bits being set to 11): the AND gate 361 is turned on by a signal in the line 347, while the other two AND gates are turned off by lack of a signal in the lines 343 and 345.

The signals in the lines 343, 345 and 347 are selected by circuits that are included in interface control circuit 335, as shown in FIG. 7, which look at the two OVRLP bits of the system configuration register 337 whose values are placed on two lines 339. A decoding circuit 363 activates only one of the lines 345, 347 or 365, depending upon the bit pattern presented to it through the lines 339. This then allows the user of the EPU circuit 171 to choose among the highest performance operation wherein all of the queuing registers are kept full (maintaining line 347 high while maintaining lines 345 and 365 low), or a lower performance mode which provides added safety when a busy signal being given whenever the data processor 315 is busy, accomplished by maintaining the line 365 high while the other lines 345 and 347 are maintained low. An intermediate tradeoff between speed and safety is had if the OVRLP bits of the system configuration register 337 cause the line 345 to be the one that turns on its associated AND gate 359.

An additional capability is provided through the use of an OR gate 367 and a decoding circuit 361 within the interface control circuits 335 (FIG. 7). An instruction being transferred to the EPU is decoded by the circuits 361 to identify those that require data to be subsequently stored by the EPU. When this type of instruction is detected, the line 343 is caused to turn on the AND gate 357 by passing through the OR gate 367, even if the line 365 is low. The EPUBSY signal is thus generated until that instruction has been executed, at which time the resulting data is available for storing.

Referring to FIGS. 10 and 11, the sequence of operations of the CPU 15 and the EPU 171 are respectively given in separate flow charts that are arranged so that operations being carried out at approximately the same time by the separate chips are shown side by side.

Beginning with FIG. 10, the added capability of using a co-processor in a computer system involves modification of operation 233 of the FIG. 2 instruction decoding cycle. That modification is to include an additional decision, shown as decision 401 on FIG. 10. In the course of generating a CPU control word, the "op code" portion 307 (FIG. 9) of an instruction is looked at in order to determine whether it is an instruction intended for an EPU. If not, the processing continues in the same manner as previously described with respect to FIG. 2. However, if it is an EPU instruction, the processor moves to another decision 403 to determine whether there is an EPU in the particular computer system in which the CPU is a part. This is determined by checking the EPA bit of the FCW register (FIG. 3A). If there is no EPU in the system, other operating software takes over, as indicated by block 405, to execute the instruction using only-the CPU. If an EPU is in the system, the CPU checks at 407 for a busy signal from it. If there is a busy signal at that instant, the CPU waits until the busy signal goes away before proceeding onto the next step 409 wherein a status code is sent on the status bus 12 from the CPU to the EPU. This is when operation of each EPU in the system begins, a step 411 of FIG. 11 indicating the receipt and decoding of that status code.

Simultaneously with sending the status code, the CPU places the entire 32-bit instruction (format shown in FIG. 9) on the system bus 11 (step 413 of FIG. 10). Each EPU on the system makes a decision 415 as to whether the status code indicates an EPU instruction is being transferred. If it is intended for an EPU, each EPU then asks at step 417 whether that instruction is intended for that particular EPU. This is accomplished by comparing the address code bits 305 of the instruction (see FIG. 9) with the address identification bits that are particular to each EPU, as set by the user through selective grounding of the two pins 172 (see FIGS. 6 and 17). If the instruction is intended for that EPU, processing by the EPU is begun.

A first step 419 preceding any actual processing causes the instruction to be loaded from the system bus 11 into a queuing register 329 of the EPU. After that, as shown in FIG. 10, the CPU places the logical program counter value for that particular instruction on the system bus 11, at step 421. Subsequently, the logical program counter is also loaded from the system bus 11 into the EPU queuing register 329, at a step 423.

A timing diagram of FIG. 12 shows the signals in the lines connecting the CPU and EPU during the instruction and logical program counter transfer. The first curve FIG. 12(A) shows a clock signal as derived from the clock circuit 97 of FIG. 17. The curve of FIG. 12(B) shows the timing on the bus 11. Instruction 425 is first sent and then immediately followed by the logical program counter value at a time 427. A curve of FIG. 12(C) shows the address strobe in line 18, while FIG. 12(D) shows the data strobe signal in line 20. FIG. 12(E) shows the read/write signal in line 21 and FIG. 12(F) shows the timing of the status bus 12 and of the signals in the lines 19 and 21.

Referring again to the flow charts of FIGS. 10 and 11, both the CPU and the EPU make decisions 429 and 431, respectively, in determining whether the instruction just sent requires a transfer of data to or from the EPU. This is determined by decoding the op code field 307 (FIG. 9) of the instruction. If no data transfer is required, the CPU operation immediately jumps toward the end, as shown in FIG. 10, and the EPU interface proceeds to set the validity bit V1 or V2 of the queuing register 329 (FIG. 6). The EPU interface processing jumps to a position near its end.

If a data transfer is required, the CPU makes a further decision 435 which determines whether the data transfer is also between the external memory, such as a random access memory 177 of the system of FIG. 17. This is also determined from the decoded op code. If not, the processing proceeds to a further decision 437 that determines the direction of data flow between the EPU and the CPU. Such data can be in the nature of words written into or read out of the CPU general purpose registers, for example. If external memory is involved in the transfer, the CPU must calculate the address in the memory of the data, at step 439, before proceeding to making a decision 441 as to whether the data flows from the EPU to the external memory or in the other direction. The memory address calculation of step 439 is essentially the same as that described in detail as the address calculation cycle of FIG. 2, steps 237 through 253.

Simultaneously with the CPU determining the data flow direction in either of the paths 441 or 437, the EPU asks the same question in a step 443. If data is being transferred from the EPU, certain steps are performed which do not exist if data is transferred into the CPU. First, a validity bit V1 or V2 is set in step 444 and the EPU busy signal in the line 14 of the system is immediately generated in a step 445. This is done through the instruction decoding circuits 361 and OR gate 367 of the control circuits 335 (FIG. 7). The signal is maintained, however, as determined by a step 447, only if the data processor 315 is busy at that instant, as will be indicated by a signal in the line 349. If the data processor 315 is busy, the EPU waits until it ceases to be so, at which time the data is available to be stored and the busy signal is eliminated at a step 449.

It can be seen from FIG. 10 that one of four paths is being followed by the CPU, if data is to be transferred somewhere, depending on the direction and destination or source of that data. In each of the four paths, operations are ceased if the EPU busy signal is detected, as indicated by the decisions 451, 453, 455 and 457. Whichever the CPU is taking, it will stop until the EPU turns off the EPU busy signal, if that busy signal is encountered at that point of the CPU processing.

Timing diagrams are provided in FIGS. 13–16 for each of the four CPU paths just mentioned, the Figure number for the appropriate timing diagram being indicated in FIG. 10 for each of these four paths. The signals shown in the each of the FIGS. 13–16 are in the same places as those described earlier with respect to FIG. 12.

Referring again to FIG. 10, data transactions involving the memory cause the CPU to place the memory address of the data on the system bus 11, indicated at steps 461 and 463 for writing and reading the EPU, respectively. For reading from memory, the EPU subsequently, as indicated in FIG. 11, will load the data placed by memory onto the system bus into its queuing registers 329 at a step 465, and a validity bit V1 or V2 is set at step 466. If a memory store operation from the EPU, however, the data is placed on the system bus 11 at a step 467, to be recorded in the memory at the address location. The number of words or bytes of data being transferred is controlled by the data length field 311 (FIG. 9) of the instruction being executed.

If external memory is not involved in the data transfer, the CPU, at a step 469, places the data from its own internal general registers onto the system bus, in the case where the flow of data is from the CPU to the EPU. The EPU then loads that data from the system bus, as indicated in step 465, and the validity bit V1 or V2 is set, at step 466. If the flow of data is in the opposite direction, however, the data is first placed onto the system bus by the EPU at the step 467, followed by the CPU, at a step 471, reading that data from the system bus into one or more of its general registers. The data length field 311 (FIG. 9) controls the number of data words that are sent one after the other in executing the instruction.

The data transfer is then completed for each of the four paths being discussed, except in the case where data has just been transferred from the EPU to external memory. In this case, something must be done concerning preexisting data that may reside in cache memory 25 at the same physical address to which the data was just written into external memory. This is necessary to make sure that there is not accessible data in the internal cache and external memories that is different for the same address location. Rather than updating the cache data, however, it has been found to be more efficient to merely set the validity bits for any data at that physical address to show the data to be invalid so that it can no longer be accessed from the cache memory 25. Thus, steps 289', 291' and 293' are provided which serve the same function as previously described for the steps 289, 291 and 293 of FIG. 2. At the end of these three decisions, a step 473 will clear the validity bits of the data in the cache memory 25 to prevent its subsequent access and use.

At the end of the EPU processing for this cycle, a decision 475 is made as to whether the EPU is ready to receive another instruction. This illustrates the operation of the circuit of FIG. 7 already described. If it is not ready to receive another instruction, because its designated queuing registers are filled, for example, a step 477 causes an EPU busy signal to be generated which will be maintained until the EPU is ready to receive another instruction. At that time, the busy signal is eliminated in a step 479.

The CPU is acting upon that busy signal by interrogating it at a step 481 of FIG. 10. If it exists at the end of the processing cycle, the CPU then looks to the EPUO bit of the hardware interface control register (FIG. 3(B)), as indicated by a decision 483. If that bit is set to allow the overlap previously discussed, the process is finished, thereby to enable the CPU to proceed with receiving and executing another instruction. If overlap is not enabled, however, the CPU will remain stopped until the busy signal is removed by the EPU.

In a specific example, the following overlap choices can be made by programming the OVRLP field of the EPU system configuration register (FIG. 8) and the EPUO bit of the CPU hardware interface control register (FIG. 3(B)) as indicated:

| OVERLAP MODE | OVRLP FIELD | EPUO BIT | DESCRIPTION |
| --- | --- | --- | --- |
| No Overlap (Simplified error handling) | 00 | 0 | The EPU completely executes an EPU instruction before the CPU proceeds. |
| Simple Overlap | 00 | 1 | After the EPU has received an struction, the CPU proceeds to the next EPU instruction and waits for the EPU to complete the instruction being executed. |
| Intermediate Overlap | 10 | 0 | When the EPU is executing an instruction and has another instruction in its queue, then the CPU waits for the EPU to complete the instruction being executed. |
| Maximum Overlap (Maximum Performance) | 11 | 1 | When the EPU is executing an instruction and has two instructions in it queue, then the CPU proceeds to the next EPU instruction and waits for the EPU to complete the instruction being executed. |

Although the various aspects of the present invention have been described with respect to its preferred embodiments, it will be understood that the invention is to be protected within the scope of the appended claims.

It is claimed:

1. In a computer system including a single integrated circuit chip central processing unit (CPU) and a separate extended processing unit (EPU) integrated circuit chip wherein both are connected to a common bus of the computer system, said CPU comprising on a single chip:
   means for placing instructions and data on said common bus that is intended for use by the EPU,
   means responsive to a busy signal received from said EPU on a circuit other than said common bus for disabling said placing means so long as said busy signal exists, and
   means responsive to a control register bit for causing said disabling means to ignore said busy signal if said control register bit is set to allow overlapping operation of the EPU.

2. In a computer system including an extended processing unit (EPU) and a controlling central processing unit (CPU) connected to a common system bus, said EPU comprising on a single integrated circuit chip:
   a plurality of queuing registers for receiving and storing instructions and data from the system bus under the control of the CPU,
   a control register having at least one bit position that is used to specify the maximum number of said queuing registers that can be filled at any one time, and
   means responsive to said at least one control register bit position and to said plurality of queuing registers for sending a busy signal to the CPU on a circuit other than said system bus when a number of said queuing registers are filled equal to the number specified by said at least one register bit position, whereby the CPU is notified by the busy signal that the specified number of queuing registers are filled.

3. A computer system including at least one single integrated circuit chip central processing unit (CPU), at least one single integrated circuit extended processing unit (EPU), and at least one memory integrated circuit chip, all of which are connected by a common system bus and a control lines, said CPU comprising:
   means responsive to instructions read from memory for identifying whether a given instruction is intended to control an operation of the CPU or an EPU,
   means responsive to said identifying means for transferring instructions intended for the EPU onto the system bus, whereby the EPU may read the instruction from said system bus,
   means responsive to EPU instructions requiring data for transferring said data onto the system bus,
   means receiving a busy signal from said EPU for disabling said instruction and data transferring means so long as the busy signal exists,
   a control register having at least one bit position that may be set to allow overlapping operation of the CPU and EPU, and
   said disabling means being characterized by allowing said at least some operations of the CPU notwithstanding the busy signal if said control register bit is set to allow such overlapping operation, and
said EPU comprising:
   a plurality of queuing registers for receiving and storing instructions and data from the system bus under the control of the CPU,
   a control register having at least one bit position that is used to specify the maximum number of said queuing registers that can be filled at any one time, and
   means responsive to said at least one bit position and to said plurality of queuing registers for sending said busy signal to the CPU when a number of said queuing registers are filled equal to the number specified by said at least one bit position.

4. In a computer system including a central processing unit (CPU) and an extended processing unit (EPU) connected by a common system bus and control circuits, an improved CPU comprising:
   means for placing instructions and data on said common bus that is intended for use by the EPU,
   means responsive to a busy signal received from said EPU through said control circuits for disabling said placing means so long as said busy signal exists, and
   means responsive to a control register bit for causing said disabling means to ignore said busy signal if said control register bit is set to allow overlapping operation of the EPU.

5. In a computer system including an extended processing unit (EPU) and a controlling central processing unit (CPU) connected by a common system bus and control circuits, an improved EPU comprising:
   a plurality of queuing registers for receiving and storing instructions and data from the system bus under the control of the CPU,
   a control register having at least one bit position that is used to specify the maximum number of said queuing registers that can be filled at any one time, and
   means responsive to said at least one control register bit position and to said plurality of queuing registers for sending a busy signal to the CPU through said control circuits when a number of said queuing registers are filled equal to the number specified by said at least one register bit position, whereby the CPU is notified by the EPU busy signal that the specified number of queing registers are filled.

6. A computer system including a central processing unit (CPU), at least one extended processing unit (EPU), and a memory, all of which are connected by a common system bus and control lines, said CPU comprising:
   means responsive to instructions read from said memory for identifying whether a given instruction is intended to control an operation of the CPU or an EPU,
   means responsive to said identifying means for transferring instructions intended for the EPU onto the system bus, whereby the EPU may read the instruction from said system bus,
   means responsive to EPU instructions requiring data for transferring said data onto the system bus,
   means receiving a busy signal over the control circuits from said EPU for disabling said instruction and data transferring means so long as the busy signal exists,
   a control register having at least one bit position that may be set to allow overlapping operation of the CPU and EPU, and
   said disabling means being characterized by allowing said at least some operations of the CPU notwithstanding the busy signal if said control register bit is set to allow such overlapping operation, and
said EPU comprising:

a plurality of queuing registers for receiving and storing instructions and data from the system bus under the control of the CPU, a control register having at least one bit position that is used to specify the maximum number of said queuing registers that can be filled at any one time, and means responsive to said at least one bit position and to said plurality of queuing registers for sending said busy signal to the CPU when a number of said queuing registers are filled equal to the number specified by said at least one bit position.

* * * * *